United States Patent
Okamoto et al.

(10) Patent No.: US 6,648,513 B2
(45) Date of Patent: Nov. 18, 2003

(54) PLAIN BEARING

(75) Inventors: Yutaka Okamoto, Nagoya (JP); Satoshi Imai, Nagoya (JP); Nobutaka Hiramatsu, Nagoya (JP); Hideo Ishikawa, Nagoya (JP); Takayuki Shibayama, Nagoya (JP); Ken Kitahara, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/090,621

(22) Filed: Mar. 6, 2002

(65) Prior Publication Data

US 2002/0126924 A1 Sep. 12, 2002

(30) Foreign Application Priority Data

Mar. 7, 2001 (JP) ........................... 2001-063396

(51) Int. Cl.⁷ ............................................. F16C 17/02
(52) U.S. Cl. .................. 384/276; 384/192; 384/283
(58) Field of Search ................... 384/192, 283, 384/294, 288, 276

(56) References Cited

U.S. PATENT DOCUMENTS

| | | | |
|---|---|---|---|
| 4,930,910 A | * 6/1990 | Mori et al. | 384/276 |
| 5,913,608 A | 6/1999 | Blume | |
| 6,000,853 A | * 12/1999 | Lytwynec et al. | 384/294 |
| 6,120,187 A | * 9/2000 | Ono et al. | 384/273 |
| 6,163,961 A | * 12/2000 | McMeekin | 29/898.056 |
| 6,178,639 B1 | * 1/2001 | Lytwynec et al. | 29/898.047 |
| 6,234,678 B1 | * 5/2001 | Tsuji et al. | 384/276 |
| 6,263,575 B1 | * 7/2001 | Andler et al. | 29/898.042 |
| 6,267,508 B1 | * 7/2001 | Bank et al. | 384/276 |
| 6,273,612 B1 | * 8/2001 | Ono et al. | 284/276 |
| 6,316,061 B1 | * 11/2001 | Andler et al. | 427/566 |

FOREIGN PATENT DOCUMENTS

GB        2 227 799        8/1990

* cited by examiner

*Primary Examiner*—David A. Bucci
*Assistant Examiner*—Julie K. Smith
(74) *Attorney, Agent, or Firm*—Browdy and Neimark, P.L.L.C.

(57) ABSTRACT

There is disclosed a plain bearing comprising: a back metal; and a bearing alloy layer bonded onto the back metal which bearing alloy layer is provided at a surface side thereof with a cylindrical bearing face extended in the direction of the axis of the plain bearing, the bearing alloy face being provided at each of axial terminal portions thereof with an inclination face inclined radially outwardly from a location defined between both of axially terminal ends of said bearing face toward said axially terminal ends thereof, the inclination face having an axial length varying along the circumference of the inclination face.

2 Claims, 10 Drawing Sheets

PLAIN BEARING

BACKGROUND OF THE INVENTION

The present invention relates to a journal plain bearing in which a bearing alloy layer is provided on a back metal, and more particularly to a plain bearing in which the wear resistance and anti-seizure property are improved.

For example, in a plain bearing used in an engine for a vehicle, a taper-shaped crowning shown by reference symbol "C" in FIG. 10 is provided in both of the axially end portions of a bearing face. The reason why the crowning C is provided is explained below.

FIG. 11, for example, shows a bearing structure in the side of the large end portion of a connecting rod. The connecting rod 1 acts to receive the combustion pressure of a fuel from a piston and to transmit the combustion pressure to a crank side. In the connecting rod 1, a plain bearing 3 is provided in the large end portion 2, and a crank pin 4 is supported by the plain bearing 3. The crank pin 4 is bent to have a circular arc shape due to the combustion pressure applied thereto from the connecting rod 1, which causes the crank pin 4 to abut on both end portions of a bearing face in the plain bearing 3. In this case, in FIG. 11, the deflection of the crank pin is exaggeratedly depicted.

In a case where the crank pin 4 abuts on both of the end portions of the plain bearing 3, the thickness of a lubricating oil film in the portions is reduced, and the oil film is apt to be broken due to a load fluctuation, a rotational speed fluctuation or the like. Further, in a case where the oil film breakage occurs, a so-called metallic contact that both of a bearing alloy layer 5 of the plain bearing 3 and the crank pin 4 are in direct contact with each other is caused, so that the premature wear and seizure of the plain bearing are apt to occur. Thus, in conventional plain bearings, the crowning C shown in FIG. 10 is provided in each of the end portions of the plain bearing 3 so as to prevent the plain bearing 3 from abutting against the end portions of the plain bearing 3 even when the crank pin 4 is bent, thereby preventing the premature wear and seizure thereof.

SUMMARY OF THE INVENTION

Regarding recent plain bearings, the present inventors have found a phenomenon explained below. FIG. 12 shows the variation of an oil film thickness along an axial direction of the plain bearing 3, which variation is theoretically calculated while taking the elastic deformation of both of the plain bearing 3 and the large end portion 2 into consideration (, in which calculation the deflection of the crank pin 4 is neglected). According to this, the oil film thickness becomes maximum at a center portion of the axial length of the plain bearing 3 (, that is, around a location shown by "0") and becomes smaller as approaching each of the axial ends thereof from the center portion. This is because the largest load is applied to the axial center portion of the plain bearing 3 with the result that an oil film pressure becomes highest in the axial center portion in the same manner as that of the oil film thickness distribution, so that the bearing face of the plain bearing 3 is deformed to have a concave shape of a circular arc in such a manner as the axial center portion of the plain bearing 3 comes to be deepest in depth for the reason disclosed below. In a case where the bearing face is deformed in the manner explained above, the crank pin 4 comes to abut both end portions of the plain bearing 3.

As regards the main reasons why the bearing face of the plain bearing 3 is deformed in the manner explained above, the present inventors have found the following two reasons. One of them is that the bearing alloy layer 5 constituting the bearing face is formed of an Al alloy, a Cu alloy or the like which is comparatively soft. Thus, the bearing alloy layer 5 is elastically deformed in the thickness direction in a manner that the axial center portion thereof becomes deepest in depth in the elastic deformation to which axial center portion the largest oil film pressure is applied.

Another of them is a light weight design of the engine for recent vehicles. That is, due to the light weight design of the engine, the aluminum alloy is used in many members constituting the engine, or a bearing housing portion for securing the bearing is made to be thin in thickness. This light weight design is also applied to the connecting rod 1, so that a rigidity of the large end portion 2 tends to be reduced. Further, due to this reduction of the rigidity, the large end portion 2 finally receiving the load applied to the plain bearing 3 is elastically deformed, so that the whole of the plain bearing 3 is elastically deformed in the radial direction thereof to thereby have a convex shape such as that of a barrel. Thus, the bearing face itself is deformed to have an arcuate, concave shape in axial cross section.

However, since the conventional crowning C is provided for compensating the deflection of the crank pin 4, it is impossible to address the problem of the unfavorable abutment occurring due to the elastic deformation of the bearing alloy layer 5 and/or the elastic deformation of the large end portion 2 of the connecting rod 1, so that there occurs the problem that it is impossible to avoid the occurrence of the premature wear and/or the seizure. As means for addressing the problem, it appear advisable to increase in the axial direction an area forming the crowning C. However, since the area in which the lubricating oil film is formed is reduced insofar as this means is concerned, a load-receiving area is reduced with the result the true specific load of the bearing is increased unfavorably, so that the load capacity of the bearing becomes reduced to an unacceptable degree.

The present invention is achieved by taking the matter explained above into consideration, and an object of the invention is to provide a plain bearing which can prevent a shaft from abutting against the end portions of the plain bearing due to the elastic deformation of the bearing alloy layer and/or of the bearing housing, while suppressing the decrease in the load-bearing capacity of the plain bearing.

According to the first aspect of the present invention, there is provided a plain bearing comprising a back metal, a bearing alloy layer bonded onto the back metal, said bearing alloy layer having:

a cylindrical bearing face present on a side of a surface of said bearing alloy layer;

an end portion present at each of axially terminal sides of said bearing alloy layer;

at least one inclination face provided at each of said end portions, which inclination face is extended from an axially predetermined location of said bearing face to the end portion of the bearing alloy layer so that said inclination face is tilted radially outwardly of said cylindrical bearing face from said axially predetermined location toward said end portion and so that axial length of said inclination face is varied along a circumference of said cylindrical bearing face.

In the plain bearing according to the first aspect of the invention, since at least one inclination face inclined radially outwardly from the axially predetermined location defined between both ends of a bearing face toward the end of the bearing face is formed in each of the axially terminal sides of the bearing face in such a manner as to have different, axial lengths in respective portions defined along the circumference of the cylindrical bearing face, it is possible to compensate the elastic deformation of the bearing alloy layer and/or the bearing housing. That is, since the axial length of the inclination face along the circumference of the bearing face are selected to compensate the elastic deformation varying along the circumference of the bearing face, it is possible to minimize the area in which the inclination face is provided. Accordingly, it is possible to compensate the elastic deformation of the bearing alloy layer and/or the bearing housing while suppressing the decrease in the load capacity of the plain bearing, and it is possible to prevent the premature wear and the seizure.

According to the second aspect of the invention, there is provided a plain bearing set forth in the first aspect of the invention, in which the axial length of the inclination face is longest at an axially extended portion of the bearing face at which portion an oil film pressure becomes maximum, and in which plain bearing the axial length of the inclination face decreases as being spaced apart circumferentially from the location of the maximum oil film pressure. That is, in a case where the rigidity of the bearing housing is relatively low in the axial direction of the plain bearing, the axial length of the inclination face is selected so that the axial length thereof may become longest at the portion having a maximum oil film pressure in the bearing face and so that the axial length thereof may be decreased as being spaced apart therefrom in the circumferential direction. In the case of the plain bearing, the bearing face of the plain bearing is deformed in a arcuate concave shape in axial cross section with a deepest position being present at the maximum oil film pressure portion, however, according to the structure of the second aspect of the invention the axial length of the inclination face is made to be longest at the maximum oil pressure portion, so that it is possible to minimize the abutting of the shaft against both axial end portions of the bearing face.

According to the third aspect of the invention, there is provided a plain bearing set forth in the first aspect of the invention, in which the axial length of the inclination face is shortest at an axially extended portion of the bearing face at which portion an oil film pressure becomes maximum, and in which plain bearing the axial length of the inclination face increases as being spaced apart circumferentially from the location of the maximum oil film pressure. That is, in another case where the rigidity of the bearing housing is relatively high in the axial direction of the plain bearing (as shown in FIG. 6), the degree of the elastic deformation of the concave shape occurring at the maximum oil pressure portion of the bearing face is small, so that the axial length of the inclination face can be made to be short at the portion having a maximum oil film pressure in the bearing face. Thus, since the area of a bearing face portion adapted to bear the load of the shaft can be increased at the maximum oil film pressure portion, it is possible to make the axial length of an inclination face portion other than that of the maximum oil film portion long so that the bearing area of the bearing face may be reduced. Since, in the bearing face portions (other than the maximum oil pressure portion) in which the axial length of the inclination face is increased, it is possible to reduce the area of the bearing face adapted to receive a shearing resistance of the oil film without large decrease in the load-bearing capacity of the plain bearing, it is possible to reduce the friction loss of the plain bearing.

DESCRIPTION OF THE PREFERRED EMBODIMENT

A first embodiment of a plain bearing embodying the invention for a crank pin mounted to a connecting rod of an engine for a vehicle is described below while referring to FIGS. 1 to 5.

Figure 4:
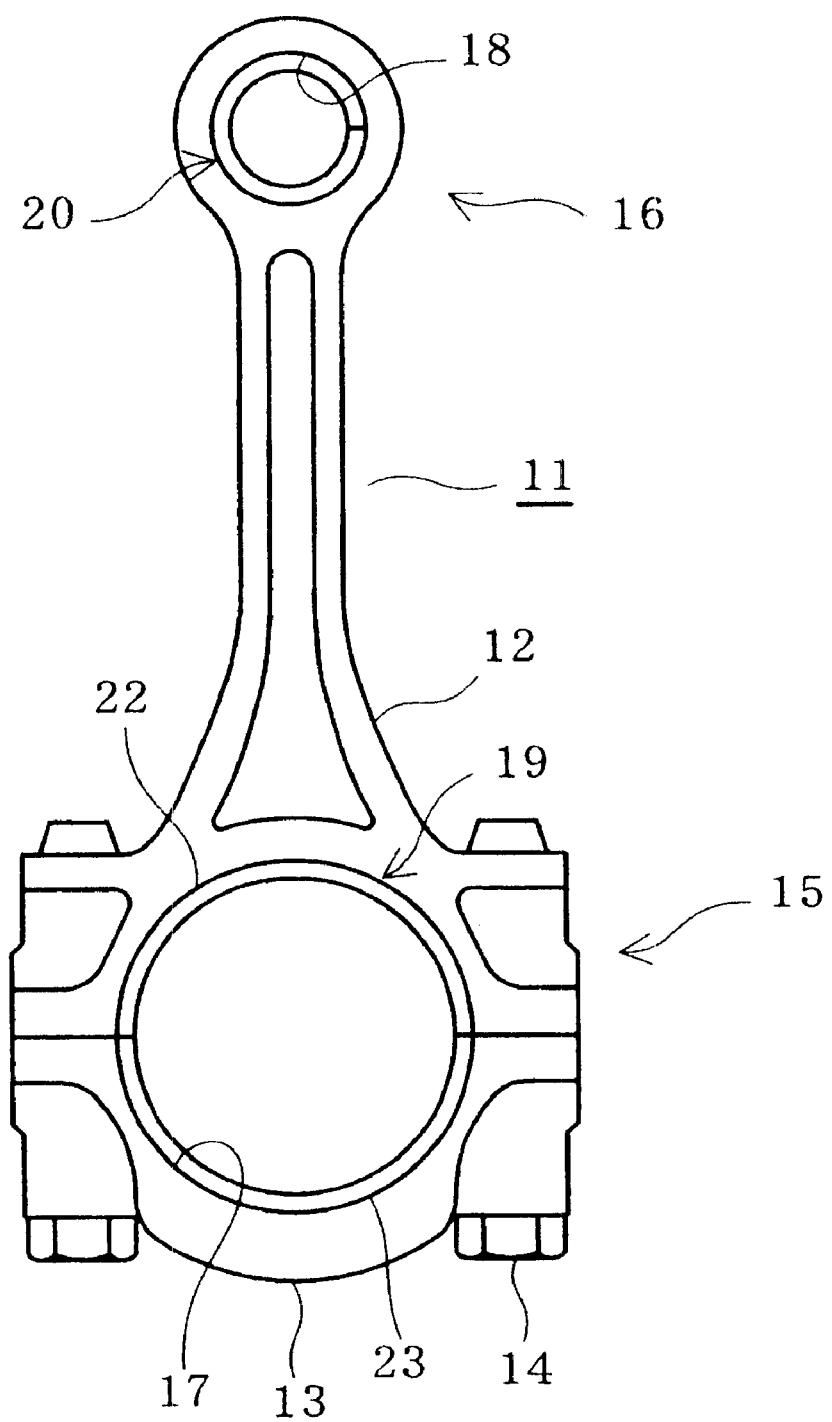
FIG. 4 is a front elevational view of a connecting rod.
Figure 5:
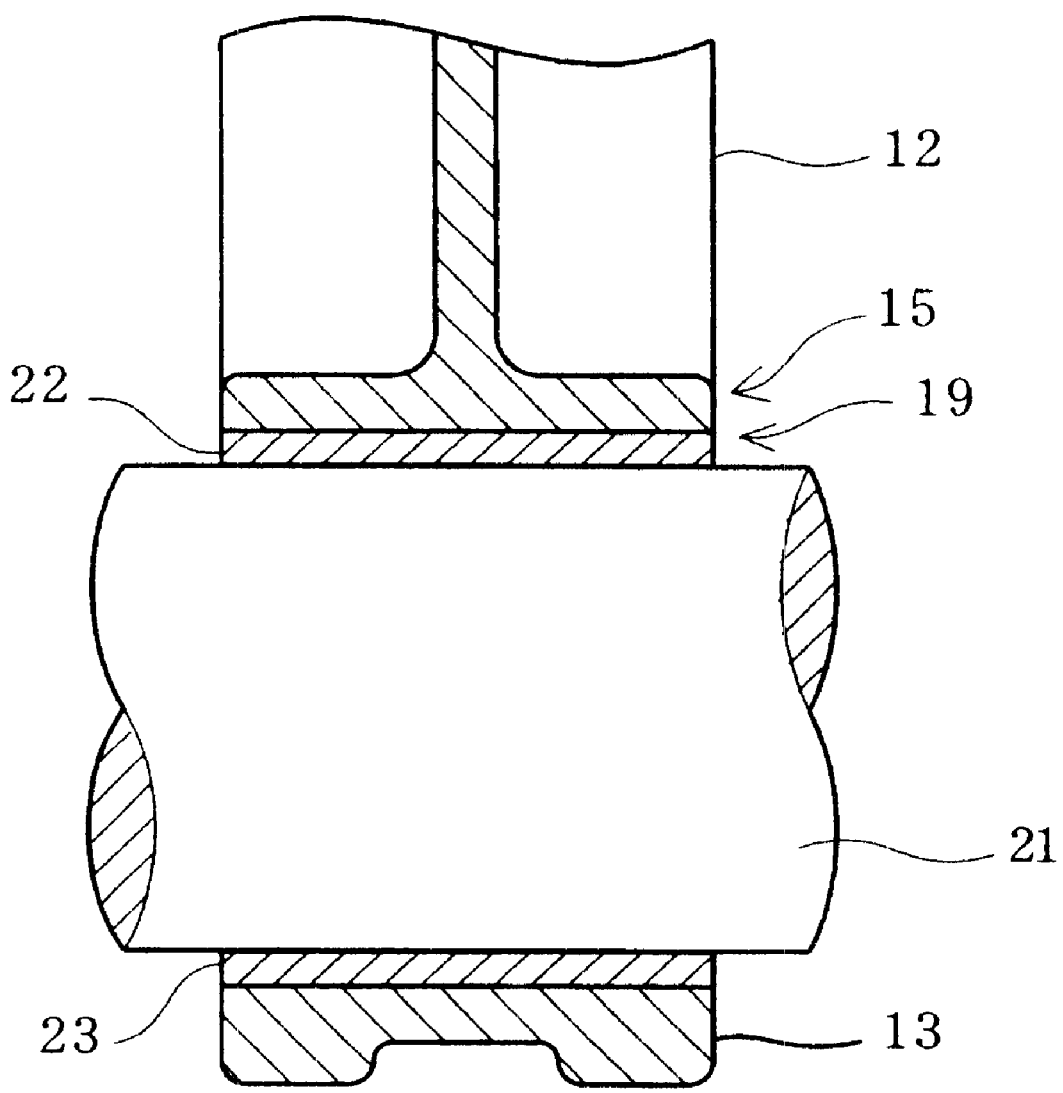
FIG. 5 is a longitudinal cross sectional side view of a large end portion of the connecting rod.

FIG. 4 shows the whole of the connecting rod. In FIG. 4, a connecting rod 11 is constituted such that a cap 13 is fixed to one wide end portion of a rod main body 12 by bolts 14. In this connecting rod 11, a large end portion 15 constituted by one end portion of the rod main body 12 and the cap 13, and a small end portion 16 corresponding to another end portion of the rod main body 12 act as bearing housings, and plain bearings 19 and 20 are mounted within fitting holes 17 and 18 formed in the large end portion 15 and the small end portion 16, respectively.

Figure 1:
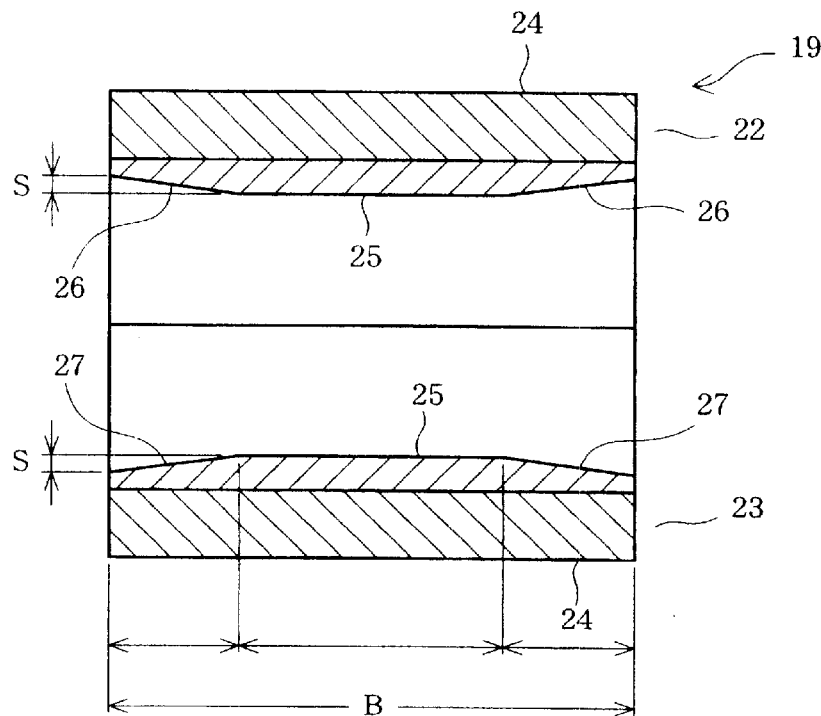
FIG. 1 is a vertical cross sectional view of the main portion of a plain bearing according to the first embodiment of the invention.

In the plain bearings 19 and 20, the plain bearing 19 of the large end portion 15 acts to receive a crank pin (refer to FIG. 5) of a crank shaft, and the plain bearing 20 of the small end portion 16 acts to receive a piston pin (not shown) assembled in the piston. The plain bearing 19 for the large end portion 15 relating to the present invention is formed to be a two-piece-divided type in which two half bearings 22 and 23 shown in FIG. 1 are assembled into the plain bearing. In this case, the plain bearing 20 of the small end portion 16 is formed of a wound bush or a cylindrical body having no joint portion.

Each of the upper and lower half bearings 22 and 23 constituting the plain bearing 19 of the large end portion 15 is provided with a back metal layer 24 made of a steel, and a bearing alloy layer 25 made of an Al-based alloy, or a Cu-based alloy etc. bonded to the back metal layer 24. In this case, an overlay layer may be provided on the surface of the bearing alloy layer 25. In each of the half bearings 22 and 23, inclination faces 26 and 27 are formed in both of the axially terminal sides of a bearing face constituted by the inner peripheral surface of the bearing alloy layer 25.

Since each of these inclination faces 26 and 27 has the same constitution, only the inclination face 26 of the upper half bearing 22 is explained below, and the explanation of the inclination face 27 of the lower half bearing 23 is omitted. In this case, in the upper and lower half bearings 22 and 23, the portions at each of which the maximum oil film pressure occurs is present at symmetrical positions.

Figure 2:
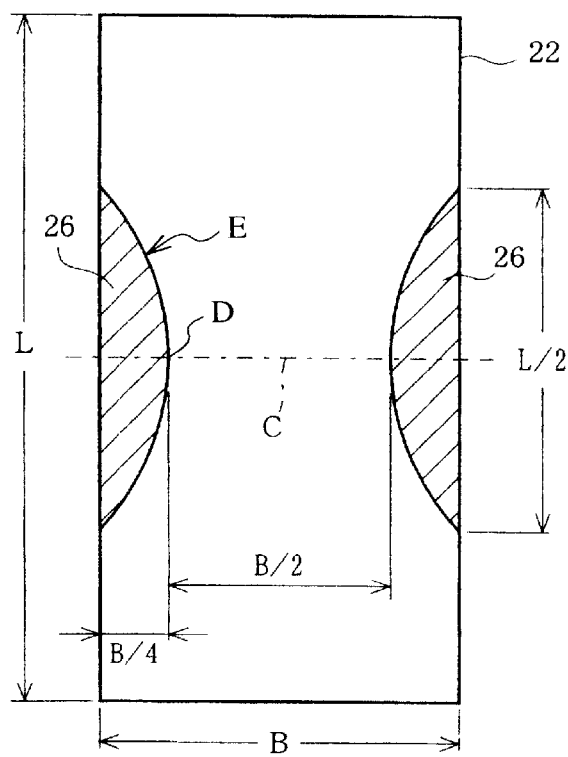
FIG. 2 is a development view of an upper half bearing.

In this case, each of the inclination faces 26 provided in both of the axially terminal sides of the half bearing 22 is extended from a maximum oil film pressure portion "D" (present in a maximum oil film pressure line "C" along which the maximum oil film pressure exists) spaced apart by "B/4" from each of the ends of the cylindrical bearing alloy layer so that the axially inner end of the inclination face 26 may be present along an arcuate line "E" having a circumferential length "2/L". Each of the inclination faces is inclined radially outwardly from each of points present along the arcuate line "E" toward each of axially corresponding points present along the axial end of the bearing alloy layer. Thus, an axial length of the inclination face 26 is varied along the arcuate line "E", as shown in FIG. 2 showing the developing view of the half bearing 22. In this case, the axial rigidity of the large end portion 15 is relatively low, and the axial length of the inclination face 26 is set to be largest at the location of the maximum oil film pressure line "C" and to be reduced in succession as spaced apart circumferentially from the line "C".

Next, the setting of the start position of the inclination face 26 and the setting of the degree of the inclination of the inclination face 26 are described below.

Figure 3A:
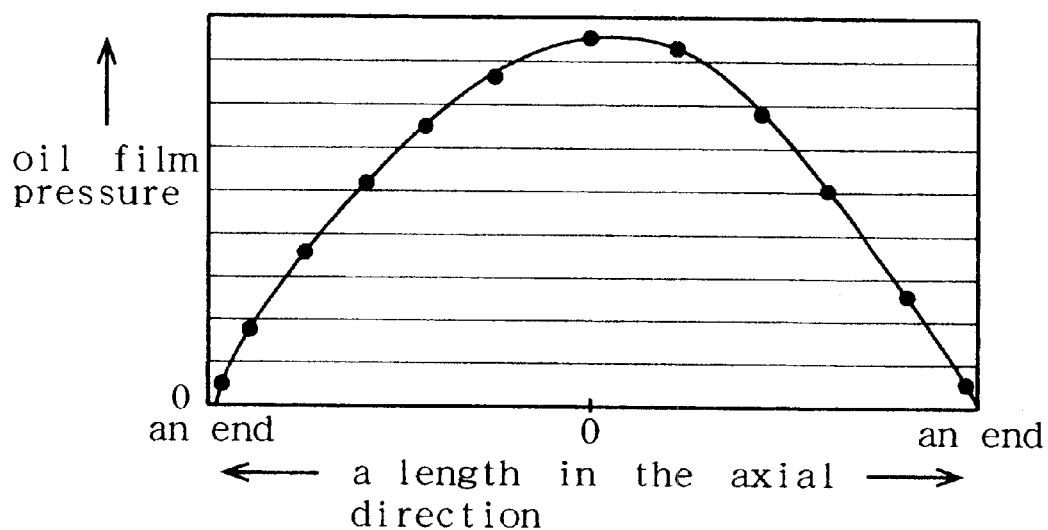
FIGS. 3A and 3B are graphs showing an oil film pressure distribution of a bearing face and a concave deformation occurring in the bearing face.
Figure 12:
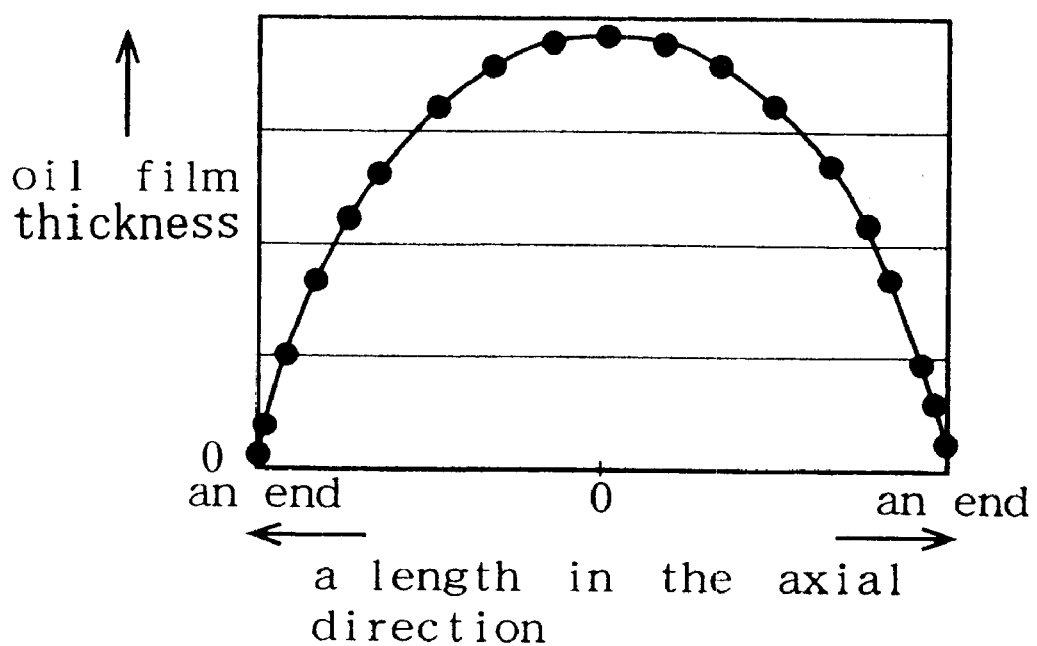
FIG. 12 is a graph showing an oil film thickness distribution occurring due to the elastic deformation of both of the bearing alloy layer and the bearing housing.

At first, FIG. 12 shows the oil film thickness distribution calculated on the basis of a hydrodynamic lubrication theory while taking the elastic deformations of both of the bearing alloy layer and the large end portion (the bearing housing) into consideration. The distribution of the oil film pressure generating the oil film thickness distribution is shown in FIG. 3A. According to FIG. 3A, since the oil film pressure of the axially center portion of the plain bearing is high, the bearing alloy layer 25 is elastically deformed in such a direction as the thickness of the bearing alloy layer is reduced, and the large end portion 15 is deformed together with the elastic deformation of the plain bearing 22, whereby the bearing face which is the inner peripheral surface of the bearing alloy layer 25 is deformed to have an arcuate, concave axial section.

Figure 3B:
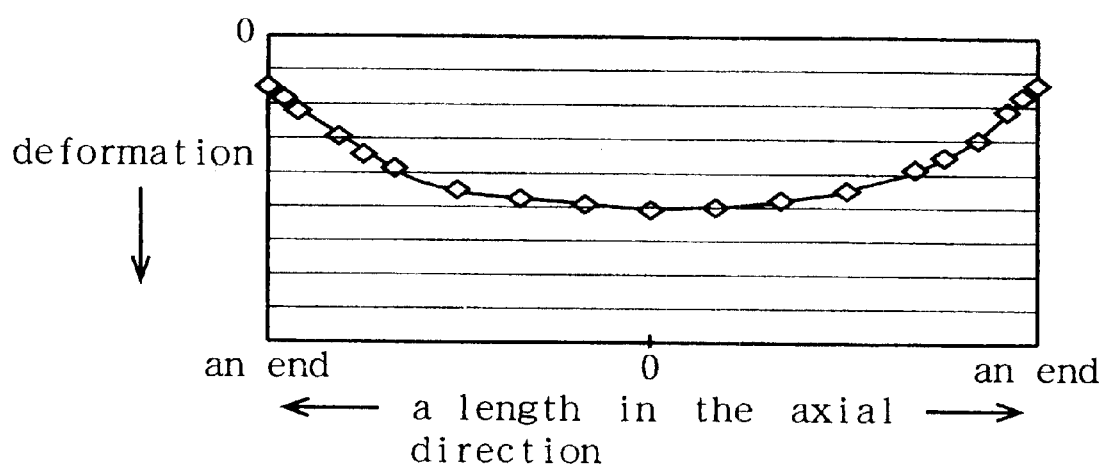

Due to the deformation of the bearing face, a gap between the crank pin 21 and the bearing alloy layer 25 is reduced at both of the axial end portions of the bearing alloy layer 25. As the result thereof, both of them come to be in direct contact with each other due to a load fluctuation etc., whereby there occurs a premature wear at each of the end portions of the bearing alloy layer 25, and the seizure thereof occurs in a case where the amount of the heat caused by the wear is large. In order to obtain the inclination face 26 capable of preventing both of the premature wear and the seizure from occurring, the deformation state of the surface of the bearing alloy layer 25 is calculated in accordance with a theoretical calculation. This is shown in FIG. 3B. Further, from this deformation state, the inclination face 26 is formed by performing a working for reducing the thickness of each of both end portions of the bearing alloy layer 25 from each of the sides of the surface of the bearing alloy layer 25.

At the maximum oil film pressure line "C" become maximum (as shown in FIG. 1) the amount "S" of the thickness reduction of the inclination face 26, which amount is selected in compliance with the amount of deformation of each of the axial end portions of the bearing alloy layer "25". That is, since the maximum thickness reduction amount S depends on the rigidity of the housing, the thickness of the bearing alloy layer and the Young's modules of the alloy, the optimal value regarding the maximum thickness reduction amount "S" is set in accordance with the following formula:

S=K×(the maximum specific load)×(the thickness of the bearing alloy layer)/(the Young's modulus of the bearing alloy layer), wherein, the reference symbol K denotes a constant determined in accordance with the rigidity of the large end portion 15, which constant K is selected within the range of 100 to 500 in accordance with the rigidity. The larger the rigidity is, the smaller the value of the constant K becomes.

Further, a circumferential area of the inclination face 26 extended circumferentially from the maximum oil film pressure line "C" (, that is, the length of the arc "E") is selected to be about one half of the circumferential length L of the inner circumference of the bearing alloy layer 22. The axial length of the inclination face 26 is selected so that it becomes longest at the location of the line "C" and so that it becomes short in succession toward each of the circumferentially terminal ends thereof while becoming zero at the circumferential ends of the inclination face 26. The specific axial length of the inclination faces 26 defined at the location of the line "C" is selected to be not more than B/4 in the case where the rigidity of the large end portion 15 is relatively low in the axial direction of the plain bearing 19, in which reference symbol "B" denotes a width of the half bearing 22. As described above, the axial length of the inclination face 26 becomes shorter as spaced apart from the line "C", which causes no problem because the load applied to the bearing alloy layer 25 becomes smaller as spaced apart from the line "C". Incidentally, a line defined by connecting start positions of the inclination faces 26 may be a straight line or may be a curved line. In this case, the inclination face 26 also functions to cause no abutting with respect to the deflection of the crank pin 21.

According to the embodiment of the invention, since the inclination faces 26 are provided in both of the axial sides of the bearing face, it is possible to prevent the crank pin 21 from abutting against both end portions of the bearing 19 due to the deformation of the cylindrical bearing face, and to prevent the premature wear and the seizure from being caused. Further, since the axial length of the inclination face 26 is short in the portion where the deformation amount of the bearing face is small, it is possible to keep a large area effectively acting as the bearing face, so that it is possible to prevent the premature wear and the seizure from occurring, while suppressing the decrease in load capacity.

Figure 6:
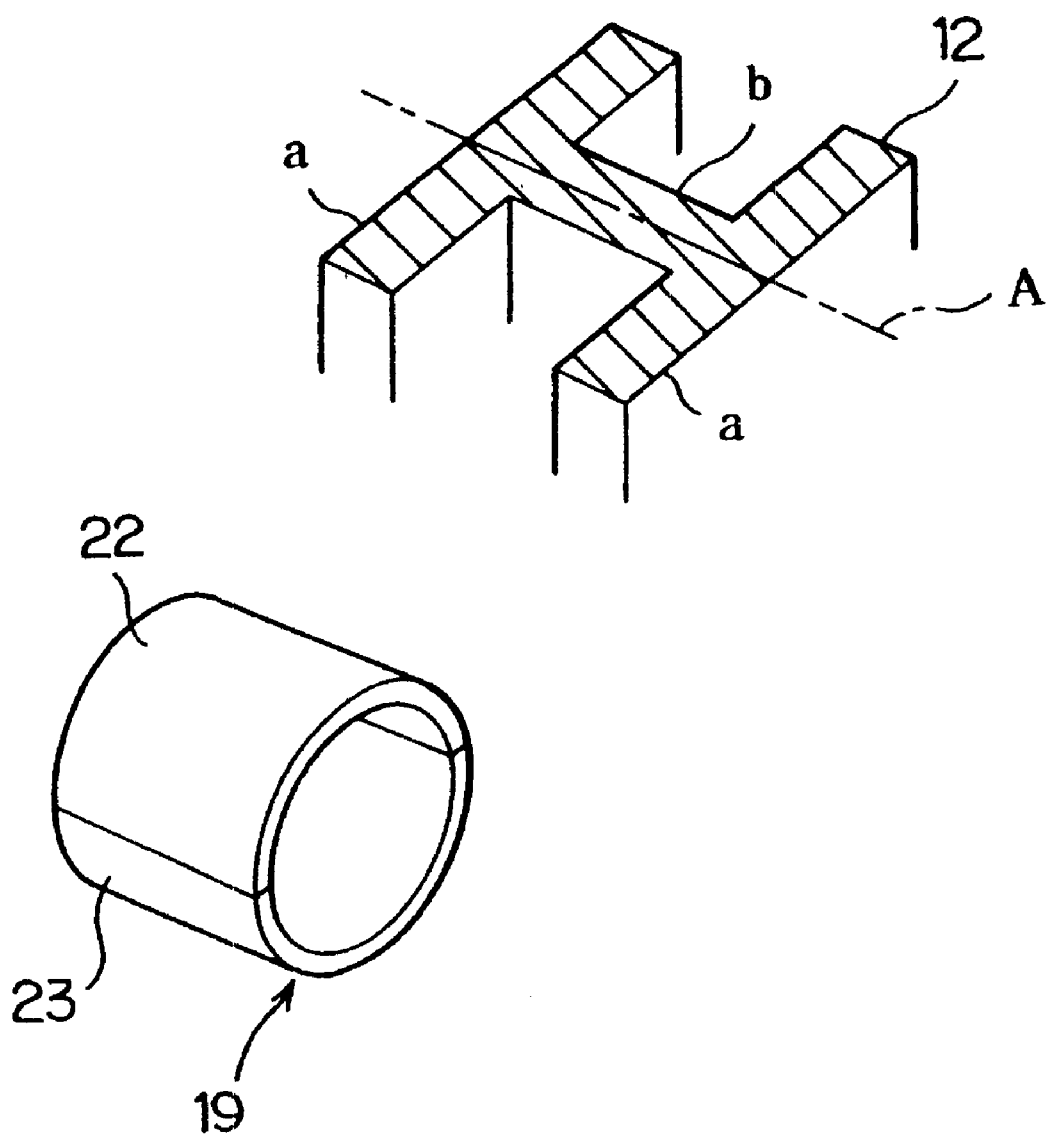
FIG. 6 is a partially sectioned, perspective view of a connecting rod and a perspective view of a plain bearing in a case where a bearing housing comes to have the large rigidity in the axial direction of the plain bearing, in which FIG. 6 there is shown a relative location relation between the cross sectional shape of a rod main body having the axis "A" and the plain bearing according to the second embodiment of the invention secured to the housing (not shown) in the direction of the axis "A"
Figure 7:
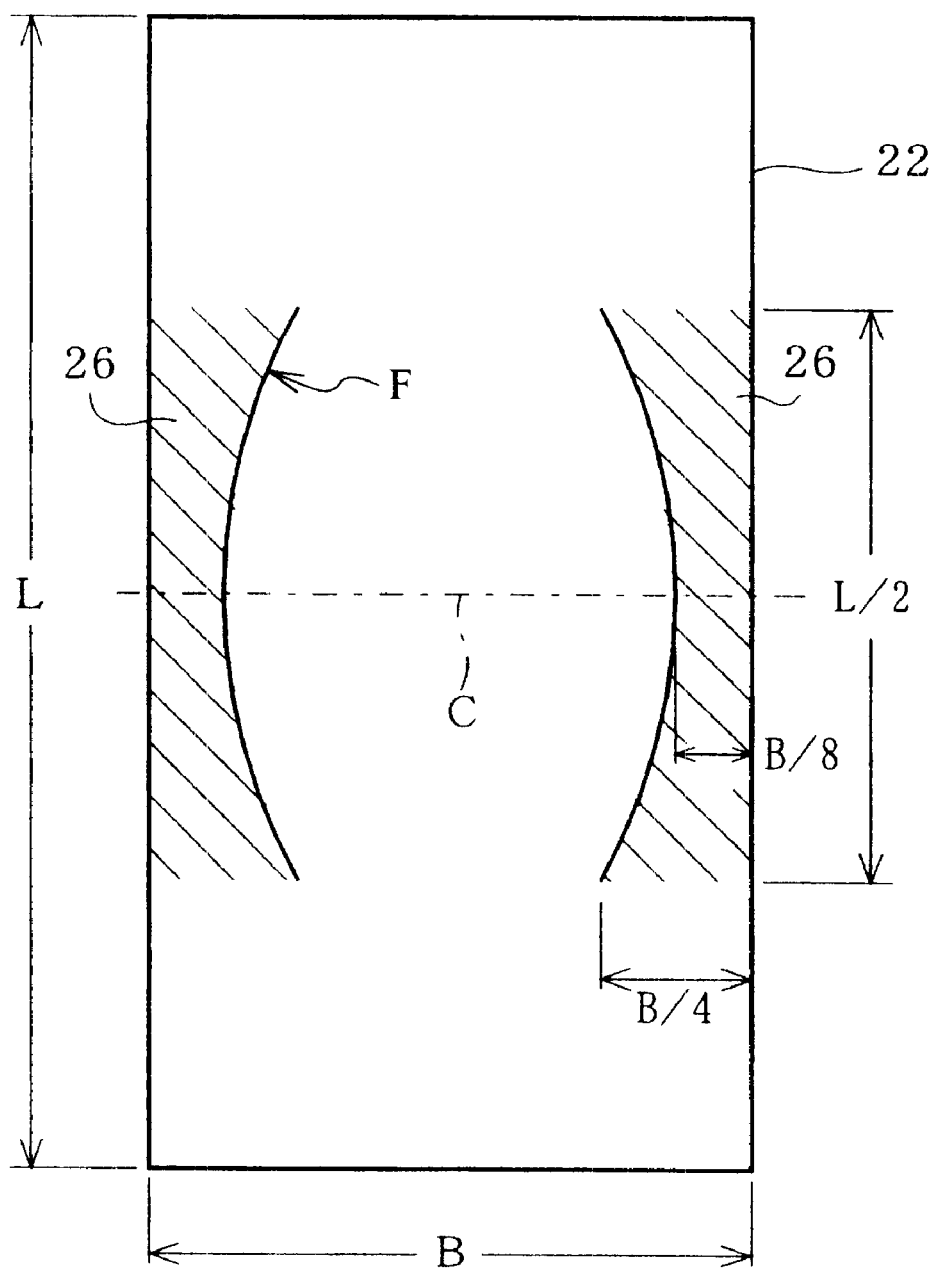
FIG. 7 is a view corresponding to FIG. 2 with respect to the second embodiment.

In FIGS. 6 and 7 is disclosed a second embodiment of the invention, in which the same reference numerals are used regarding the same elements as those of the first embodiment.

In this embodiment, the rod main body 12 is formed to have a H-shaped cross section as shown in FIG. 6, and the direction, in which a web "b" connecting both of the side pieces "a" to each other is extended, coincides with the axial direction of the plain bearing 19 shown by a single-dot chain line "A". In this rod main body 12, the web "b" comes to be hardly deformed in the axial direction of the plain bearing 19 mounted in the large end portion 15, that is, the rigidity of the large end portion 15 is relatively high in the direction of the axis of the plain bearing 19. In the case where the rigidity of the large end portion 15 is high in the direction of the axis of the plain bearing which is to be mounted in the large end portion, the axial length of each of the inclination faces 26 formed in the terminal sides of the half bearing 22 is set, as shown in FIG. 7, to be not more than B/8 at the location of the maximum oil film pressure line C, and this axial length is set to increase in succession as spaced apart from the line C in the circumferential direction of the bearing face. In this case, the circumferential area of the inclination face 26 (, that is, the length of the arc "F") is in a range of L/2 with the center thereof being present on the line C, and the axial length of the inclination face 26 defined at each of the cercumferential ends thereof is set to be not more than B/4.

According to this inclination face 26, in the portion extending in the axial direction along which the maximum oil film pressure portion is extended, the area of the bearing face substantially receiving the shaft becomes long at the location of the line "C", so that the bearing area can become large at the location of the line "C", whereby the axial length at other locations of the inclination faces can be increased and the bearing area thereof can be reduced. In other words, in the portion in which the axial length of the inclination face is increased, it is possible to reduce the bearing area acting to receive the shearing resistance of the lubricating oil film without substantially reducing the load capacity of the bearing alloy face, so that it becomes possible to reduce the friction loss of the plain bearing.

In this case, the present invention is not limited to the embodiments mentioned above and shown in the drawings, and the following expansions and modifications can be employed.

Figure 8:
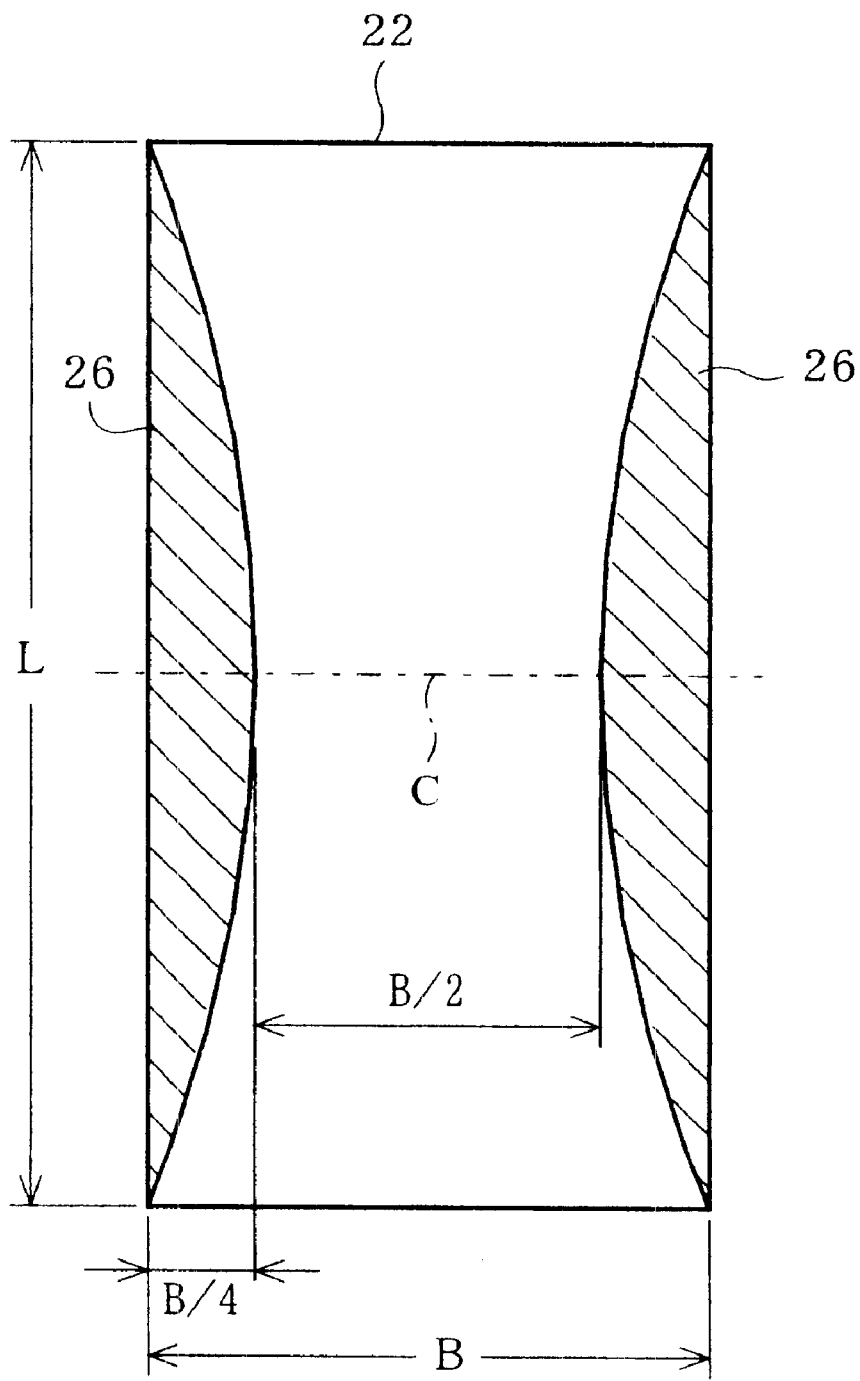
FIG. 8 is a view showing a third embodiment of the invention, which view corresponds to FIG. 2.

The areas of the inclination faces 26 and 27 provided in the first embodiment may be circumferentially extended to the whole of the circumference of each of the half bearings 22 and 23 as shown in FIG. 8 as the third embodiment of the invention.

Figure 9:
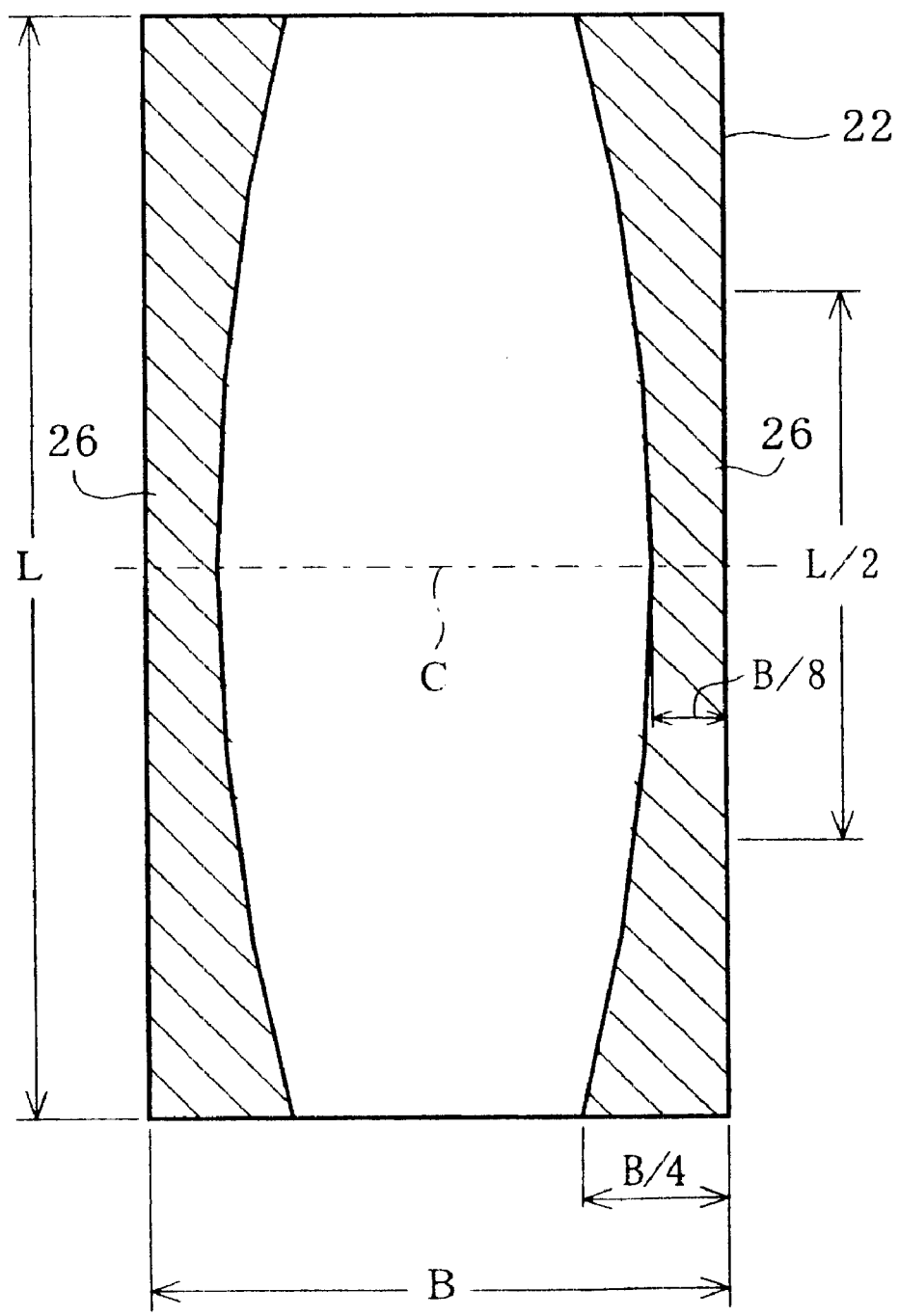
FIG. 9 is a view showing a fourth embodiment according to the invention, which corresponds to FIG. 2.
Figure 10:
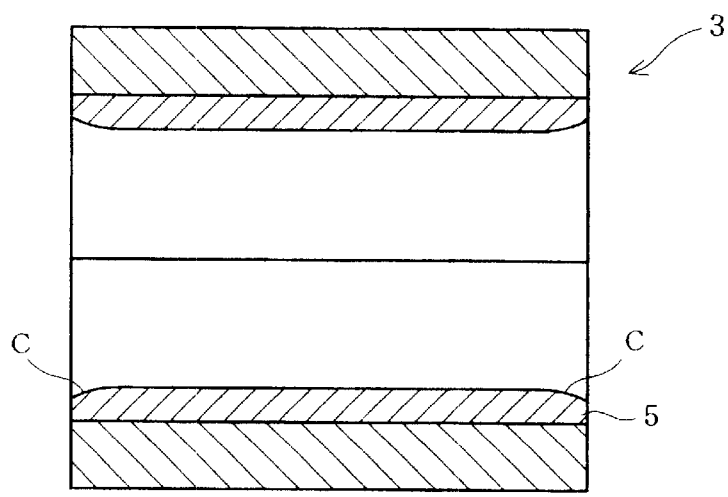
FIG. 10 is a view showing a conventional plain bearing provided at each end thereof with a crowning, which view corresponds to FIG. 1.
Figure 11:
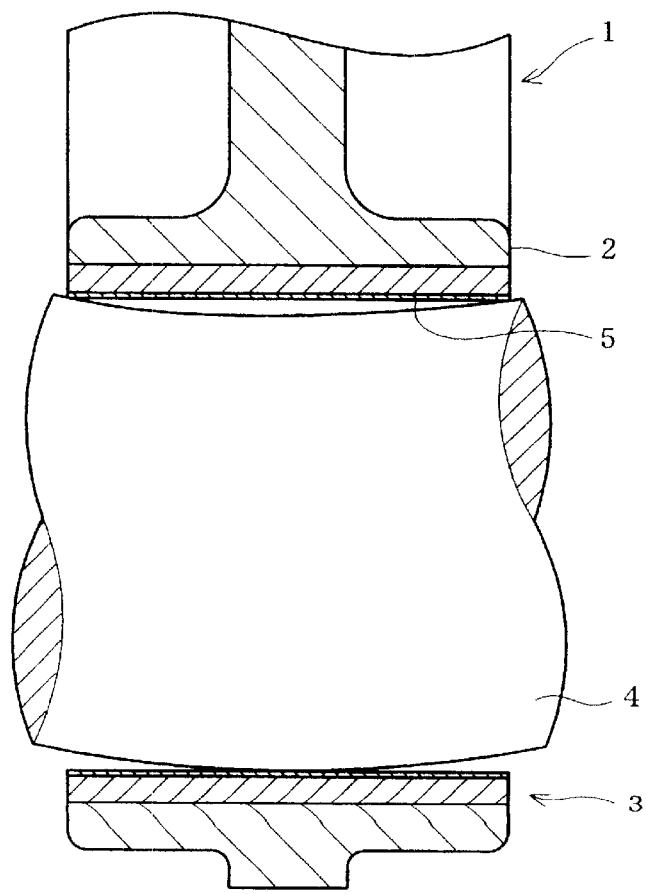
FIG. 11 is a view showing a state in which a crank pin is bent, which view shows the reasons why the crowing shown in FIG. 10 is provided in the conventional plain bearing.

Further, the areas of the inclination faces 26 and 27 provided in the second embodiment may be circumferentially extended to the whole of the circumference of each of the half bearings 22 and 23 as shown in FIG. 9 as the fourth embodiment of the invention. In the case of FIG. 9, the axial length of the inclination faces 26 and 27 at the circumferentially terminal ends thereof is set to be not more than B/4.

What is claimed is:

1. A plain bearing comprising:
   a back metal; and
   a bearing alloy layer bonded onto said back metal which bearing alloy layer is provided at a surface side thereof with a cylindrical bearing face extended in a direction of an axis of said plain bearing,
   said bearing alloy face being provided at each of axially terminal portions thereof with an inclination face inclined radially outwardly from a location defined between both of axially terminal ends of said bearing face toward said axially terminal ends thereof,
   said inclination face having an axial length varying along the circumference of said bearing alloy layer;
   wherein the axial length of said inclination face is set to be shortest at each of axial locations corresponding to maximum oil film pressures which are present on the bearing face, and said axial length is increased in succession as spaced apart therefrom in the circumferential direction.

2. A plain bearing comprising two assembled half bearings, each one of said half bearings comprising:
   a back metal; and
   a bearing alloy layer bonded onto said back metal which bearing alloy layer is provided at a surface side thereof with a cylindrical bearing face extended in a direction of an axis of said plain bearing,
   said bearing alloy face being provided at each of axially terminal portions thereof with an inclination face inclined radially outwardly from a location defined between both of axially terminal ends of said bearing face toward said axially terminal ends thereof,
   said inclination face an axial length varying along the circumference of said bearing alloy layer;
   wherein said two half bearings are symmetrical whereby said inclination face provided at each end of said bearing in one said half bearing is symmetrical to each said inclination face of the other half bearing with respect to an axis of said plain bearing,
   wherein the axial length of said inclination face is set to be longest at each of axial locations corresponding to maximum oil film pressures which are present on the bearing face, and said axial length is reduced in succession as spaced apart therefrom in the circumferential direction,
   wherein the maximum axial length of each said inclination face of each said half bearing is no greater than ¼ of the axial length of said half bearing.

* * * * *